United States Patent [19]
Taylor, III

[11] Patent Number: 5,824,138
[45] Date of Patent: Oct. 20, 1998

[54] SYSTEM FOR REMOVING NOXIOUS ODORS FROM A CHEMICAL TANKER TRUCK

[76] Inventor: C. Milton Taylor, III, 512 Allegheny St., Boswell, Pa. 15531

[21] Appl. No.: 847,276

[22] Filed: May 1, 1997

[51] Int. Cl.⁶ .................................................. B01D 46/00
[52] U.S. Cl. .......................... 95/288; 55/385.3; 55/385.4; 55/423; 55/490.1
[58] Field of Search ................................ 55/385.3, 385.4, 55/385.1, 356, 319, 423, 445, 462, 501, 525, 267, 490.1; 95/273, 288

[56] References Cited

U.S. PATENT DOCUMENTS

| | | |
|---|---|---|
| 244,630 | 7/1881 | Legate . |
| 2,784,801 | 3/1957 | Lunde ..................................... 55/385.3 |
| 2,976,950 | 3/1961 | Smith ..................................... 55/385.4 |
| 3,611,905 | 10/1971 | Brinks et al. ........................... 55/385.4 |
| 3,722,189 | 3/1973 | Tourtellotte ............................ 55/389 |
| 3,776,283 | 12/1973 | Kramer et al. ......................... 96/113 |
| 3,820,914 | 6/1974 | Zimmerman ........................... 404/110 |
| 4,072,435 | 2/1978 | Coho et al. ............................. 404/110 |
| 4,172,865 | 10/1979 | Steier ..................................... 261/62 |
| 4,441,898 | 4/1984 | Revell .................................... 55/350 |
| 5,067,856 | 11/1991 | Sisk ........................................ 55/274 |
| 5,073,259 | 12/1991 | Solimar ................................. 55/385.3 |
| 5,591,244 | 1/1997 | Vross et al. ............................ 55/385.4 |

*Primary Examiner*—Duane S. Smith
*Attorney, Agent, or Firm*—Webb Ziesenheim Bruening Logsdon Orkin & Hanson, P.C.

[57] ABSTRACT

Apparatus for removing noxious odors from a chemical tanker truck hauling hot hydrocarbon products includes a condensation box mounted below the tank. The condensation box has a perforate metal mesh filter media positioned within its interior. A pair of conduits delivers hot chemical vapor from the top of the tank to the condensation box in a location spaced below the metal mesh filter media. The hot vapor passes upwardly through the metal mesh filter media and is cooled to cause condensation of a noxious fraction from the vapor which collects in the bottom of the box. A less noxious fraction of the vapor leaves the condensation box through a plurality of vent pipes positioned above the filter media.

14 Claims, 3 Drawing Sheets

SYSTEM FOR REMOVING NOXIOUS ODORS FROM A CHEMICAL TANKER TRUCK

BACKGROUND OF THE INVENTION

The present invention relates generally to air filtration apparatus and, more particularly, to apparatus and methods for treating noxious vapors emitted from tanker trucks in the transport of hot coal tar, pitch, creosote, naphthalene and other hot hydrocarbon products. In the transport of hot hydrocarbon products, it is necessary to vent the tank to the atmosphere so as to permit the hot vapors to escape from the tank. Typically, hydrocarbon chemical products are transported at elevated temperatures on the order of about 500°–700° F. in a tanker truck having a capacity of from about 5,000 to 7,000 gallons. It is an absolute necessity in non-pressure vessel style tanks to vent the vapors from a tank of this size, otherwise, the tank may explode due to the great pressure generated by the hydrocarbon vapors within.

Heretofore, it has been conventional practice in the transport of such hot hydrocarbon products, to merely vent the tank to the atmosphere. This practice results in the continuous escape of noxious vapors into the atmosphere which causes a number of problems. One of the more common problems is the objectionable odor emitted by the vapor and the complaints generated from people exposed to these foul vapors along the transport route. Certain unknown environmental hazards may also be present. In addition, the conventionally vented vapors cause unsightly black deposits along the exterior of the tanker truck while also representing an economic loss due to the escaping vapors.

The present invention is directed to an apparatus and method for solving the problems heretofore encountered in transporting hot hydrocarbon products such as coal tar products, pitch, creosote, naphthalene and the like. The present invention provides an apparatus and method for filtering the hot vapors from a chemical tanker truck to remove noxious odors therefrom while recovering a liquid hydrocarbon component for recycling thereof. The invention also includes an apparatus and method for inducing a draft of vapor from the chemical product tank to the filter unit while the tanker truck is in motion so as to increase the efficiency of the filtration system.

The present invention further provides a filtration system for chemical tanker trucks which is economical to fabricate and trouble-free to operate, requiring no supplemental power or moving parts, other than the truck itself.

Still further, the present invention is also suitable for use in connection with pressurized tank trucks for filtering vapors which remain in the tank under pressure after the tank is unloaded.

SUMMARY OF THE INVENTION

Briefly stated, the apparatus of my invention includes a condensation box mounted beneath the tank portion of the tanker truck. The condensation box has a top, a bottom and enclosing side walls defining an open interior therein. A filter, preferably in the form of a perforate metal mesh filter, is mounted within the interior of the condensation box at a location spaced above the bottom thereof. The condensation box also includes vent means, preferably in the form of a plurality of pipes angularly disposed from the rear side wall to permit communication between the interior of the box and the atmosphere. At least one, and preferably, a pair of conduits extend from an upper portion of the tank having first ends in communication with the interior of the tank and second ends communicating with the interior of the condensation box, at a position below the perforate metal filter.

In use, pressurized hot hydrocarbon vapor leaves the tank and passes through the conduits to enter the lower part of the condensation box. The vapor passes upwardly through the perforate metal filter media and, in the process, is cooled. A noxious fraction of the hot vapor then condenses as it is cooled by the metal filter and the condensed liquid collects at the bottom of the condensation box. A fraction of less noxious vapor passes through the perforate metal filter media and leaves the box in a gaseous state via the vent pipes to the atmosphere. The condensation box includes an access door preferably at a front side wall to permit access to the interior of the box to permit changing and/or cleaning of the filter media periodically. The invention also includes drain means at the bottom of the condensation box to allow for recapture and recycling of the condensed liquid fraction of the hydrocarbon product which collects at the bottom of the condensation box.

One aspect of the invention pertains to the operation of the vent pipes. Preferably four vent pipes are fitted on the rear wall of the condensation box. The condensation box also preferably includes a transverse wall spanning the interior of the box from opposed side walls, extending upwardly from a rearward end of the filter with an upper edge spaced from the top of the box. The transverse wall defines an isolation area adjacent to the vent pipes. The vent pipes are fitted at about a 45° angle relative to the end wall such that their outer ends are lower than the attached ends. In this manner, when the tanker truck is in motion, the ambient air passing along the condensation box and vent pipes causes a lower pressure area to exist at the outside ends of the vent pipes, and within the isolation area of the condensation box. This vacuum-like condition causes an induced draft within the condensation box and induces a flow of vapors from the tank through the conduits to the condensation box as the truck is in motion.

These, as well as other advantages and attributes of my invention will become more readily apparent when reference is made to the drawings taken with the following detailed written description.

DETAILED DESCRIPTION OF THE INVENTION

Figure 1A:
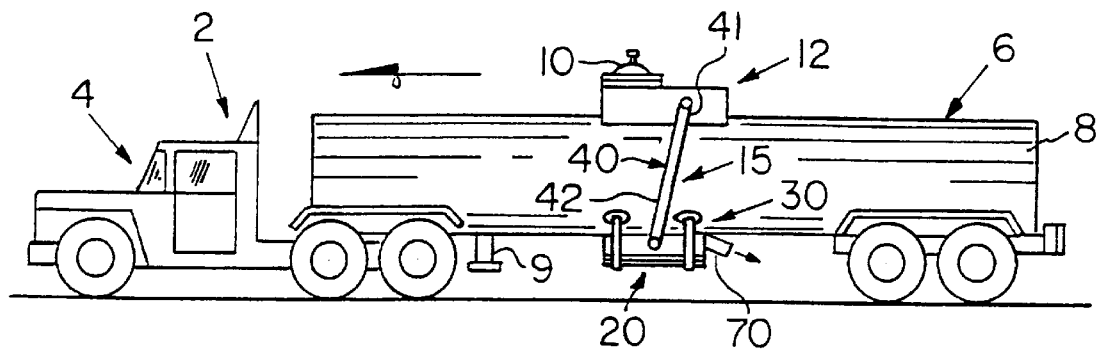
FIG. 1A is a side elevational view of a typical tanker truck fitted with the filtration system of the present invention.
Figure 1B:
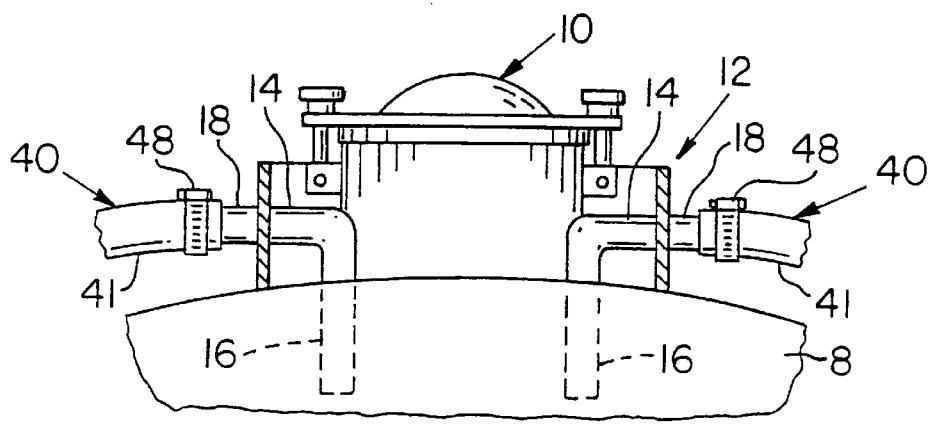
FIG. 1B is an enlarged, fragmentary end view of the dog box at the top of the tank showing the vent conduits of the present invention attached thereto.

With reference to the drawings, a typical tanker truck 2 is shown in FIG. 1A which includes a conventional tractor truck 4, and a tanker trailer 6. The tanker trailer 6 has a tank 8 which may typically have a liquid capacity of between 5,000 to 7,000 gallons. The conventional tank trailer has eight rear wheels, a dolly 9 for supporting the trailer when it is detached from the truck and a hingeably-mounted domed lid 10 at the top for loading a liquid chemical product into the interior of the tank 8. As seen in FIGS. 1A and 1B, the tank 8 includes a so-called dog box 12 surrounding the lid 10. A pair of breather pipes 14 is mounted in the dog box 12, each breather pipe having an inner end 16 communicating with the interior of the tank 8 and an outer end 18 positioned outside of the tank. Breather pipes are conventionally used on hot chemical tanks to vent hot vapors to the atmosphere so as to avoid pressure build-up in the tank.

The filtration system of the present invention, generally designated by reference numeral 15, includes a condensation box 20 mounted by frame means 30 to the bottom of the tank 8 of the trailer 6. The system 15 further includes at least one, and preferably two, conduits 40 extending from the top of the tank 8 to the condensation box 20. The conduits 40 each have a first end 41 attached to the respective outer ends 18 of the breather pipes 14 and second ends 42 attached to the condensation box, as more fully described below.

The condensation box 20 is preferably made from welded steel or aluminum plate. The condensation box 20 comprises a top plate 21 and a bottom plate 22 enclosed by lateral side walls 23 and 24 and a front end wall 25 and a rear end wall 26. The enclosing plates; namely, top plate 21, bottom plate 22, lateral side walls 23, 24, and end walls 25 and 26, when joined, define an open interior 28 within the condensation box 20.

Figure 3:
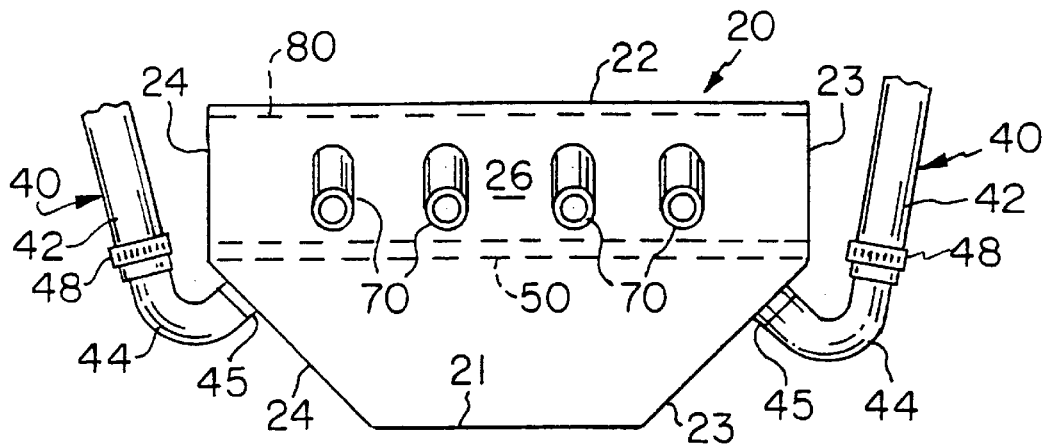
FIG. 3 is a rear end view of the filtration system of the present invention.
Figure 5:
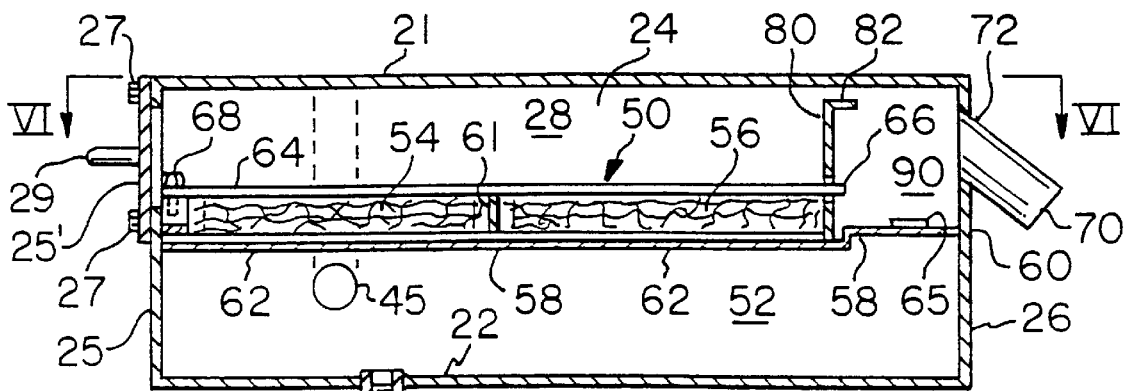
FIG. 5 is a cross sectional side elevation view of the condensation box of the filtration system of the invention taken along section line V—V of FIG. 6.
Figure 6:
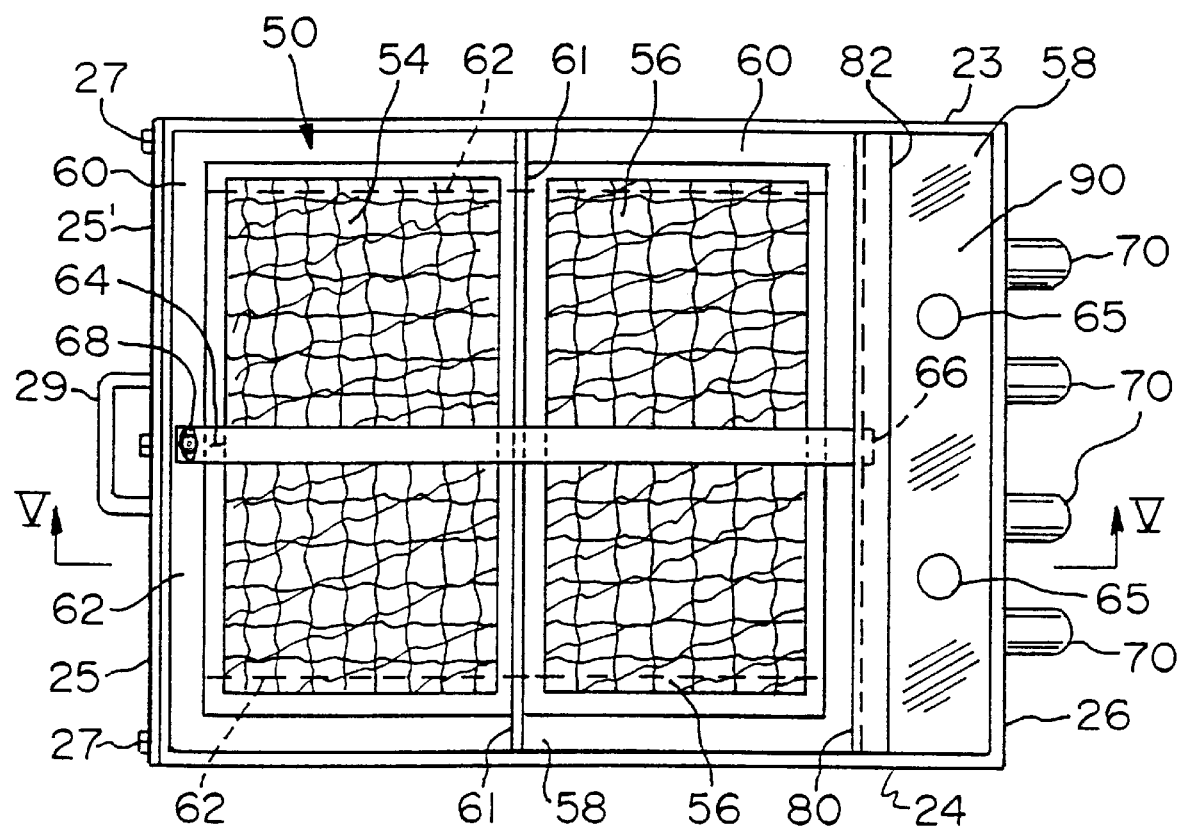
FIG. 6 is a cross sectional plan view of the condensation box of the present invention taken along section line VI—VI of FIG. 5.

A filter plate assembly 50 is mounted within the interior 28 of the condensation box 20 as shown in FIGS. 5 and 6. The filter plate assembly 50 is mounted in a position spaced above the bottom plate 22 to define a liquid condensate collection area 52 therein. As described above, the first ends 41 of each of the conduits 40 are connected at the top of the tank 8 in communication with the hot vapors emitted from the liquid chemical product being transported. A second end 42 of each of the conduits 40 is affixed to an elbow fitting 44 which, in turn, is attached to the condensation box 20 in a position 45 below the filter plate assembly 50, communicating with the interior of the filtration box in the area of the liquid condensate collection zone 52, see FIGS. 3 and 5. The first ends 41 of the conduits 40 are attached to the respective outer ends 18 of breather pipes 14 at the top of tank 8 and the second ends 42 of the conduits are attached to respective outer ends of the elbow fittings 44, using conventional hose clamps 48 or the like.

The filter plate assembly 50 comprises a pair of perforate metal mesh filters 54 and 56. The perforate metal mesh filters 54 and 56 are preferably made from aluminum mesh and may, for example, be rectangular in shape, on the order of sixteen inches wide by twenty-five inches long by two inches (16"×25"×2") thick for each filter. A perforate metal mesh filter of this type and size is marketed by Air Kontrol Inc. of Memphis Tennessee under type PH7735. An aluminum mesh filter is advantageous because of its light weight and ability to resist corrosion when exposed to hydrocarbons, as well as its high coefficient of thermal conductivity.

Figure 2:
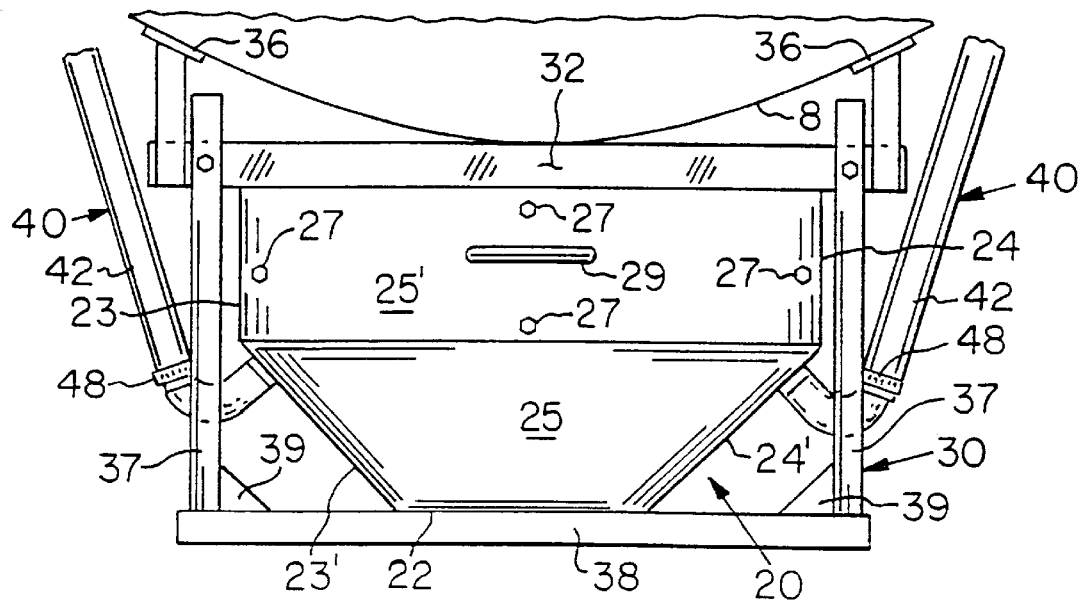
FIG. 2 is a enlarged front end view of the filtration system of the present invention fitted beneath the tanker truck of FIG. 1.

The perforate metal mesh filters 54 and 56 are mounted in a plate-like tray 58 which has two rectangularly-shaped holes formed therein to receive the filters 54 and 56. The tray 58 includes a border 60 which surrounds the open filter receiving portion and which is attached at its outer periphery to the side walls of the condensation box 20. As seen in FIGS. 5 and 6, a divider strip 61 extends between the side walls 24 and 25 to separate the filters 54 and 56. The filter tray 58 may also include a ledge 62 formed at the edges of the filter receiving opening to support the peripheral edges and align the metal mesh filters 54 and 56 within the tray opening. An elongated, rigid bar or strap 64 overlays the filters 54 and 56 and is attached at its opposed ends to the border area 60 of the filter tray 58. The hold-down strap 64 may include a tab end 66 fitted within a slot formed in the transverse wall 80 and a thumb screw 68 at the other end to provide securement of the strap 64 to the tray 58 When it is necessary to remove the filters 54 and 56 from the tray, the thumbscrew 68 is removed and the strap 64 is merely pulled away from the tray to permit removal of the filters for cleaning or replacement thereof. In order to gain access to the interior 28 of the condensation box 20 and the filters 54 and 56, the front side wall 25 has a removable panel 25' provided with bolts 27 (FIG. 2 and FIG. 5) to permit the selective removal thereof. Panel 25' has a handle 29 to allow for easy handling when removal is necessary.

As best seen in FIG. 6, the filter tray 58 also has two rupture discs 65 formed therein as a safety feature. The rupture discs 65 are partially stamped out areas designed to break free from the filter tray 58 at a given threshold pressure in the event the filters become plugged and the vapor pressure builds up in the region 52.

Figure 4:
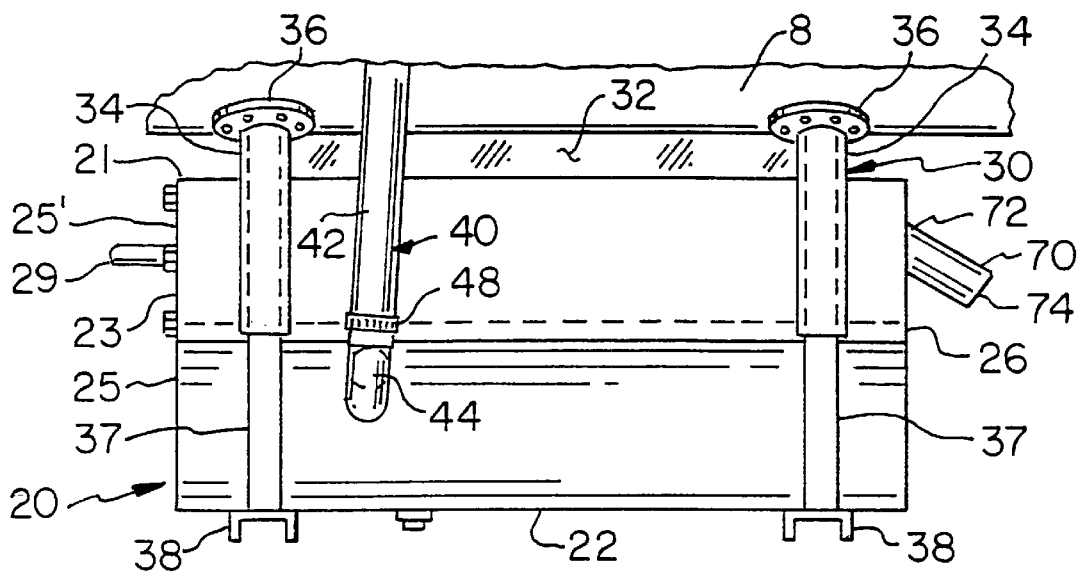
FIG. 4 is a side elevation view of the filtration system of the present invention.

The condensation box is affixed to the tank 8 by a hanger mount 30. The mount 30 comprises four beam members 32 forming a rectangular, frame-like structure. Attachment legs 34 extend upwardly from each corner of the frame-like structure formed by the beam members 32, see FIGS. 2 and 4. Each of the attachment legs 34 carries an upper flange 36 which is attached to the outside of the tank 8 by rivets, bolts, or by welding, for example. Vertical members 37 extend downwardly adjacent each of the attachment legs 34 and corners of the beam members 32. A pair of vertical members 37 at each end of the mount 30 is attached to a pair of steel channels 38 which span and support the bottom 22 of the condensation box. A gusset 39 may be welded at the joint between each of the vertical members 37 and the channels 38 to provide additional rigidity and strength to the hanger mount structure 30.

As shown in FIG. 5, the bottom plate 22 of the condensation box 20 includes a drain pipe 46 fitted with a threaded plug or valved orifice to permit selective draining of the liquid hydrocarbon product which has condensed in the collection area 52. Chemical product recovered from the drain orifice 46 may then be recycled.

As best seen in FIGS. 5 and 6, the end wall 26 contains a plurality, preferably four, vent or exhaust pipes 70. Each exhaust pipe 70 has a first end 72 attached to the end wall 26 communicating with the interior 28 of the condensation box in a position above the filter plate assembly 50. The vent pipes 70 also include a second or terminal end 74 which is lower in elevation then the first end 72 so that the pipes 70 are disposed at an angle of about 45° relative to the vertical rear end wall 26. The second ends 74 of the vent pipes, of course, communicate with the exterior atmosphere. When the truck 2 is in motion, the ambient air rapidly moves past the vent pipes 70 and causes a low pressure area to exist in the region of the second ends 74. The creation of a low pressure area causes an induced draft from the higher pressure region existing in the interior 28 of the condensation box. This action provides a natural pumping action from the interior of the box to ensure efficient operation of the device, acting much like a fan to induce a draft but without any exterior power or moving parts involved—the vacuum being created by the movement of the tanker truck itself. By way of further example, the vent pipes 70 may be one and a quarter inches (1¼") in diameter and about six inches (6") long.

A transverse wall 80 is preferably disposed within the interior space 28 of the condensation box 20, extending between the long side walls 23 and 24 of the condensation box above the filter plate assembly 50. The partition wall 80 has a top edge 82 which terminates about an inch below the upper plate 21 of the condensation box. In this manner, the partition wall 80 forms an isolated vent chamber 90 to further enhance the vacuum effect of the angled vent pipes 70.

In use, hot vapors leave the top of the tank 8 via the exhaust breather pipes 14 and travel through the conduits 40 to enter the liquid condensate collection area 52 of the interior of the collection box 20. The hot vapors flow upwardly through the metal mesh filters 54 and 56. The metal mesh cools the hot vapor as it passes therethrough whereupon a noxious fraction of the hot vapor liquefies and collects at the bottom portion 52 of the condensation box 20. Concurrently, a fraction of less noxious vapor flows upwardly from the perforate metal mesh filters and passes through the opening above the partition wall 80 entering the isolated vent chamber 90 to then exit into the atmosphere through the vent pipes 70. As mentioned above, as the tanker truck 2 moves, the air moving past the second ends 74 of the vent pipes 70 causes a lower pressure area to exist at the second ends, which, in turn, induces a draft of vapors from the conduits 40 through the filters 54 and 56 to the vent chamber 90.

It will be appreciated by those skilled in the art that while the present invention has been described above in connection with vented tank trucks, the invention is also effective when used on pressurized tank trucks which are typically unvented during transport. Naturally, tanks of this class are pressure vessels and are constructed in a robust manner which is capable of containing hot, volatile hydrocarbon chemical products without the danger of rupture. Pressurized tanks of this type are unloaded under pressure and when the liquid product has been removed from the tank, a pressurized noxious hydrocarbon vapor remains in the tank. My invention also is useful in treating the vapor remaining in such pressurized tanks. In such cases, only one vapor conduit is needed extending from the so-called "Christmas tree" valve of the tank to the condensation box mounted on the tank. A multi-ported distributor (not shown) is presently preferred to evenly distribute the high pressure vapor in the condensation box. The vapor then travels upwardly through the filter media and liquid product condenses and the less noxious fraction of vapor is vented to the atmosphere. The liquid product collected in the condensation box may then be recovered, as previously described.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

I claim:

1. Apparatus for removing noxious odors from a tank truck for transporting hot coal, tar, pitch, or other volatile product, comprising:

a) a condensation box affixed to the tank, said box having a top, a bottom, and enclosing side and end walls defining an open interior therein;
   b) filter means positioned within the interior of the condensation box at a location spaced above the bottom thereof, said filter means including a perforate metal filter media;
   c) vent means associated with the condensation box in a location spaced above said filter means to permit communication between the interior of the condensation box and an exterior atmosphere; and
   d) conduit means having a first end in communication with an interior portion of the tank where hot vapors are present and a second end communicating with the interior of the condensation box in a location spaced below the filter means, whereby, in use, hot vapor leaves the tank and passes through the conduit means to enter the condensation box to pass upwardly through the perforate metal filter media of the filter means, wherein the hot vapor cools as it passes through the metal filter media and a noxious fraction of said hot vapor liquefies to collect at the bottom of the condensation box and a fraction of less noxious vapor leaves the box in a gaseous state via the vent means to the atmosphere.

2. The apparatus of claim 1 wherein the condensation box includes means for accessing the interior of the box to permit periodic changing of the filter media.

3. The apparatus of claim 1 wherein the condensation box includes means for removing the liquefied fraction collected at the bottom of the condensation box.

4. The apparatus of claim 1 wherein the filter means comprises a filter tray fixedly attached around a perimeter thereof to the side walls of the condensation box, said filter tray having at least one opening therein to receive a perforate metal mesh filter element therein and strap means to hold the filter element in the filter tray.

5. The apparatus of claim 4 wherein the tray has two openings therein to receive two perforate metal mesh filter elements therein.

6. The apparatus of claim 4 wherein the filter tray includes rupture disc means associated therewith adapted to open when a selected maximum vapor pressure is reached in the interior of the condensation box below the filter tray.

7. The apparatus of claim 1 wherein the vent means comprises a plurality of vent pipes extending outwardly at a downward angle from a rear end wall of said condensation box, whereby when the tank truck is in motion, an ambient air stream passes around an outer end of the vent pipes to create a lower pressure region there around to induce a flow of less noxious vapor from the condensation box.

8. The apparatus of claim 1 wherein the condensation box is affixed to a bottom portion of the tank and the conduit means comprises two conduits extending respectively on opposed sides of the tank to opposed side walls of the condensation box.

9. The apparatus of claim 1 wherein the first end of the conduit means extends from a conventional dog box of a tank truck.

10. The apparatus of claim 1 wherein the tank is a pressure vessel.

11. Apparatus for removing noxious odors from a tank truck for the transporting of hot coal tar, pitch or other volatile product, said apparatus comprising:

a) vent means situated on the tank communicating with an interior portion of the tank for the passage of hot vapors therethrough;

b) a condensation box affixed beneath the tank having a top, a bottom and enclosing side walls defining an open interior therein;

c) a filter tray positioned in the interior of the condensation box affixed to the side walls of said box around a perimeter of said tray, said tray having at least one opening therein to removably receive a perforate metal filter element therein and means for releasably securing said filter element in said opening;

d) a plurality of vent pipes associated with the condensation box having respective first ends in a location spaced above said filter tray and respective second ends in an ambient atmosphere to permit communication between the interior of the condensation box and the ambient atmosphere; and e) a pair of conduits having respective first ends communicating with the vent means of the tank and respective second ends communicating with the interior of the condensation box in a location below the filter tray, said respective conduits positioned on opposed sides of said tank, whereby in use, hot vapors generated in the tank exit the vent means and travel through the respective conduits to enter the condensation box and flow upwardly through the perforate metal filter, whereupon a noxious fraction condensates from the vapor to collect as a liquid at the bottom of the condensation box and a less noxious fraction of the vapor leaves the condensation box via the vent pipes to enter the atmosphere.

12. The apparatus of claim 11 wherein an air stream passing around the second ends of the vent pipes when the tank truck is moving creates a lower pressure zone at said second ends, whereby a draft is created to induce a flow of less noxious fraction of vapors from the interior of the condensation box to the ambient atmosphere.

13. A method of removing noxious odors from a tank truck hauling hot coal tar, pitch or other volatile products, the method comprising:

a) drawing off hot noxious vapors from the tank;

b) directing the hot noxious vapors to a condensation box;

c) flowing the hot noxious vapors through a filter media;

d) cooling the hot noxious vapors in the filter media to condense out a liquid noxious fraction;

e) collecting the liquid noxious fraction in the condensation box, and;

f) venting from the condensation box to the atmosphere a less noxious fraction of cooled vapors which passes through the filter media.

14. The method of claim 13 including the step of creating a lower pressure zone exterior of the condensation box to induce the venting of the less noxious fraction of vapors to the atmosphere.

* * * * *

UNITED STATES PATENT AND TRADEMARK OFFICE
CERTIFICATE OF CORRECTION

PATENT NO. : 5,824,138
DATED : October 20, 1998
INVENTOR(S) : C. Milton Taylor, III It is certified that error appears in the above-identified patent and that said Letters Patent is hereby corrected as shown below:

Column 1 Line 18 after "of this size" delete comma and insert --;--.

Column 4 Line12 after "tray 58" insert period --.--.

Signed and Sealed this

Eighteenth Day of May, 1999

Attest:

Q. TODD DICKINSON

*Attesting Officer*    *Acting Commissioner of Patents and Trademarks*